(No Model.) 2 Sheets—Sheet 1.

A. SCHWIND.
VALVE FOR SODA FOUNTAINS.

No. 550,295. Patented Nov. 26, 1895.

WITNESSES:
Wm. H. Canfield, Jr.
Geo. F. Hall

INVENTOR:
ANDREW SCHWIND.
BY
Fred'k C. Fraentzel,
ATTORNEY (No Model.) 2 Sheets—Sheet 2.

A. SCHWIND.
VALVE FOR SODA FOUNTAINS.

No. 550,295. Patented Nov. 26, 1895.

WITNESSES:
Wm. H. Canfield, Jr.
Geo. F. Hall

INVENTOR:
ANDREW SCHWIND.
BY Fred C. Fraentzel,
ATTORNEY

UNITED STATES PATENT OFFICE.

ANDREW SCHWIND, OF NEWARK, NEW JERSEY.

VALVE FOR SODA-FOUNTAINS.

SPECIFICATION forming part of Letters Patent No. 550,295, dated November 26, 1895.

Application filed July 11, 1895. Serial No. 555,679. (No model.)

*To all whom it may concern:*

Be it known that I, ANDREW SCHWIND, a citizen of the United States, residing at Newark, in the county of Essex and State of New Jersey, have invented certain new and useful Improvements in Valves for Soda-Fountains, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in valves, and has for its primary object to provide a novel construction of spray-valve for soda-fountains which is simple and effective in its construction and positive in its results, being made to serve as a double spray-valve—that is to say, its valve construction being such that the same valve can be used to permit a slow and heavy stream of the liquid to flow from its nozzle, or the liquid can be forced from the same nozzle in a fast and fine stream with sufficient force to thoroughly mix the soda with the sirup in the glass.

In soda-fountains as now made two valves are necessary, one for filling the glass with the soda and the other, known as the "spray-valve," being used to mix the soda with the sirup previously placed in the glass. In my invention I combine the two valves into one; and I attain the several objects of this invention by the construction illustrated in the accompanying drawings, in which I have employed similar letters of reference to indicate corresponding parts in the several views, and in which—

Figure 1:
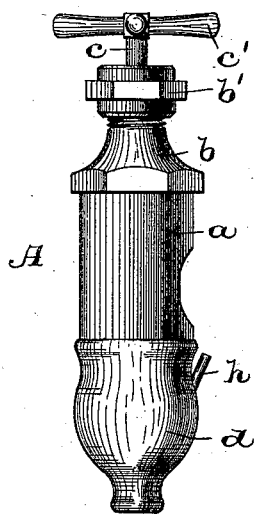
Figure 2:
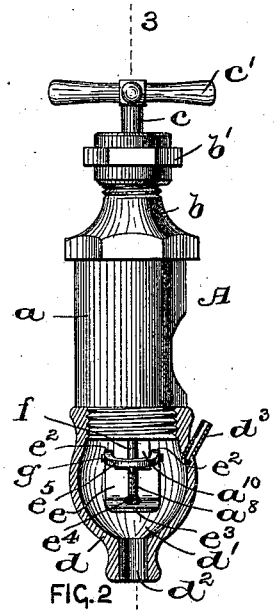
Figure 3:
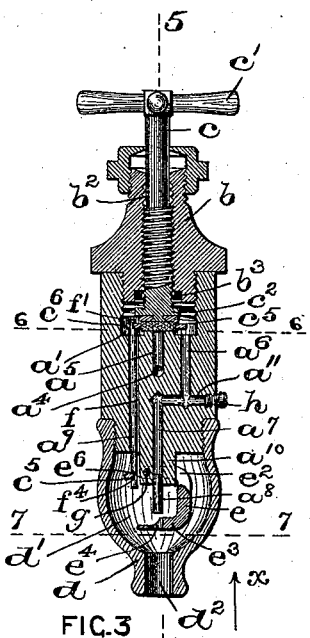
Figure 4:
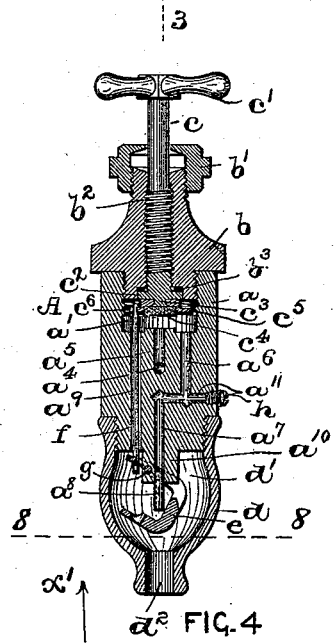
Figure 6:
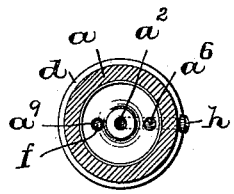
Figure 7:
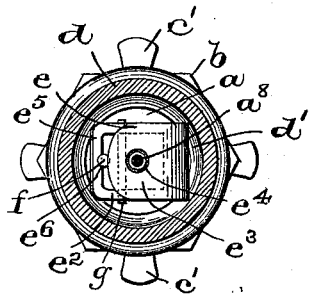
Figure 5:
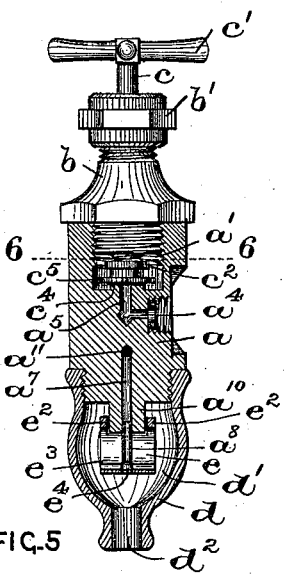
Figure 8:
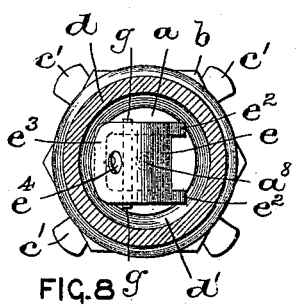
Figure 9:
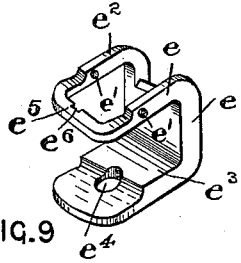
Figure 10:
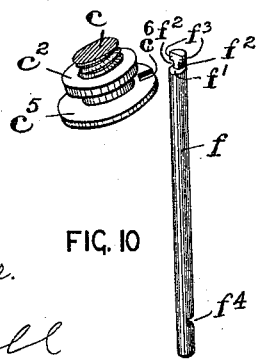

Figure 1 is a side view of my novel form of valve; and Fig. 2 is a like view of the same with the lower part of the valve-casing represented in section, clearly illustrating an arrangement of a pivoted sprayer used in connection with the valve. Fig. 3 is a vertical section of the valve, taken on line 3 3 in Fig. 2, illustrating the inner construction of the valve-casing, the ducts therein, the valve and its stem, and means connected with said sprayer for operating the same, all the said parts being represented in their normally-inoperative positions; and Fig. 4 is a like view of the valve construction with the several parts represented in their operated positions. Fig. 5 is a vertical section of the valve construction, taken on line 5 5 in Fig. 3; and Fig. 6 is a horizontal section taken on line 6 6 in Fig. 3. Fig. 7 is an enlarged horizontal section, taken on line 7 7 in Fig. 3, looking upward in the direction of arrow $x$; and Fig. 8 is a similar section, taken on line 8 8 in Fig. 4, looking in the direction of arrow $x'$. Fig. 9 is a perspective view of a sprayer employed in connection with the valve construction embodying the principles of my present invention. Fig. 10 is a detail perspective of the lower end of the valve-stem and the spreader-operating rod to be connected therewith.

Referring to the said drawings, A represents the valve-casing comprising therein the body $a$, in the top of which I have formed a chambered portion $a'$ having a valve-seat $a^2$, substantially as illustrated in Figs. 3, 4, and 5. Said chambered portion $a'$ is screw-threaded on its inner surface, and into the same is screwed the hood or top piece $b$, provided with the usual form of packing-box $b'$. Said hood $b$ is provided with the screw-threaded opening $b^2$, in which is rotatively arranged a valve-stem $c$, extending through said packing-box $b'$, and provided at the top with the handle or operating device $c'$. The lower end of said screw-stem $c$ is provided with a disk $c^2$, forming an annular shoulder, which when the stem is raised is moved into a recessed portion $b^3$ in the hood to form a stop and thereby limits the upward movement of said valve-stem $c$ and its valve thereon, as will be evident.

From an inspection of Figs. 3 and 4 it will be seen that said stem $c$ is provided with a short extension $c^3$, to which is secured a suitable valve-disk $c^4$, and rotatively arranged on said extension and directly above said valve-disk $c^4$ is a suitable collar $c^5$, having a cut-away portion $c^6$ in one side thereof, the purpose of which will be more fully described hereinafter.

When the valve is raised from its seat, as indicated in Fig. 3, the soda or other liquid flows from a supply-pipe (not shown herein) screwed into the recessed part $a^3$ in the side of the body $a$ into the tube-like portion or duct $a^4$ directly beneath the valve-disk $c^4$ and down through the ducts $a^5$, $a^6$, and $a^7$ into a tube $a^8$ in said duct $a^7$ and into the receiving-chamber $d'$, formed by a cap $d$ removably secured to the lower portion of the body $a$, and out of the nozzle $d^2$ therein, as will be clearly understood from an inspection of Figs. 3 and 4. Said body portion $a$ is also provided with a longitudinal opening or hole $a^9$, in which I have closely but reciprocally fitted a stem $f$, having at the top thereof a cut-away part forming the shoulder $f'$ and the oppositely-arranged saw-cuts $f^2$, which fit into said cut-away portion $c^6$ in the collar $c^5$, so that the wings $f^3$ on said stem $f$ (see Fig. 10) hold the same in operative engagement with the upper surface of the disk $c^5$ and cause the stem $f$ to have a reciprocal vertical movement in said opening or hole $a^9$ as the valve-stem $c$ and the valve-disk $c^4$ are moved upwardly or downwardly. The lower end of said stem $f$ projects from said opening $a^9$ down into the receiving-chamber $d'$ alongside of a squared end $a^{10}$ formed on the under side of said body portion $a$, and in which I have arranged the tube $A^8$ in communication with the duct $a^7$. In a perforation in said squared end $a^{10}$ is a pin $g$, having its ends projecting on opposite sides of the squared end portion and extending into perforations $e'$ in suitable arms $e^2$ on a spreader $e$, as will be clearly seen from Figs. 2, 7, and 8. Said spreader $e$ is provided with the solid part $e^3$, in which is a perforation or hole $e^4$, which when the valve-disk $c^4$ is on its seat is directly beneath the opening in the discharge-tube $a^8$, as clearly represented in Figs. 3 and 7. Connecting the arms $e^2$ of said spreader is a connecting part or bar $e^5$, which is cut away, as at $e^6$, and with which is operatively connected the slotted portion $f^4$ in the lower end of said stem $f$. In this manner when the valve-stem is raised the upwardly-moving stem $f$ acts on the connecting-bar $e^5$ of the spreader $e$, which will be caused to swing on the pivot of the pin $g$, thereby lowering the solid part $e^3$ and bringing the hole or perforation $e^4$ therein to one side of the opening in the tube $a^8$, as clearly indicated in Figs. 4 and 8. Thus it will be seen that when the operator quickly turns the valve-stem $c$ the valve-disk is raised from its seat in the body portion $a$, at the same time bringing the solid portion $a^4$ of the spreader directly beneath the discharge-nozzle in the tube $a^8$. The liquid coming from the supply-pipe will pass through the several ducts in the body portion $a$ in the manner hereinabove described, being finally discharged from the tube $a^9$ upon the solid part $e^4$ of the spreader $e$, as will be understood. This action of the stream upon the solid part $e^4$ will cause the receiving-chamber $d$ of the valve-casing to become quickly filled to about three-quarters, and the liquid will slowly flow in a comparatively heavy stream from the opening or nozzle $d^2$ into the glass containing the sirup. When the glass is nearly filled with soda, then it becomes necessary to mix the same with the sirup and to provide the drink with a head, in order to render it presentable and palatable. In the constructions of valves now in use this is done by placing the glass, with the liquid, under a second valve having a very fine and powerful stream. In my construction of valve this is not necessary. I simply turn down the valve-stem $c$ until the valve is nearly closed, (but still permitting a sufficient supply of the liquid from the duct $a^5$ beneath the valve-disk,) thereby bringing the hole or perforation $e^5$ in the portion $e^4$ of the spreader $e$ directly beneath the discharge-opening in the tube $a^8$, and a very fine but powerful stream of soda or other liquid passes directly through said hole $e^4$ and through the large opening $d^2$ in the cap $d$ into the glass to thoroughly mix the soda with the sirup and provide the same with a proper head.

The novelty and utility of my novel form of valve being obviously apparent, it is unnecessary to further enlarge upon the same herein; but it will be understood, however, that changes may be made in the details of the arrangements and combinations of the parts without departing from the scope of my present invention—as, for instance, the arrangement of the ducts $a^5$, $a^6$, and $a^7$ may be changed and the details of construction of the pivoted spreader may be departed from. Hence I do not wish to be understood as limiting myself to the exact arrangements and combinations of parts herein shown and described.

In order to establish communication between the ducts $a^6$ and $a^7$ in the body $a$, a hole or opening $a^{11}$ is drilled in the side of the body $a$ deep enough to communicate with the said two ducts, and this opening is then closed by means of a screw $h$ or in any other well-known manner.

The receiving-chamber $d$ may be provided with a suitable vent $d^3$ to admit the outside air upon the surface of the liquid in said chamber when the valve has been operated and to cause the liquid to readily flow from the mouth $d^2$ of the cap $d$.

Having thus described my invention, what I claim is—

1. In a valve, the main casing provided with a valve seat and liquid conveying ducts, a valve disk and stem for operating the valve disk, a receiving chamber at the bottom of said main casing, having a nozzle or outlet, a liquid spreader pivotally arranged in said chamber, and means connecting said spreader with said valve disk, for operating said spreader when the valve stem is worked, to vary the diameter of the stream of liquid from the nozzle connected with said receiving chamber, substantially as and for the purposes set forth.

2. In a valve, the main casing provided with a valve seat and liquid conveying ducts terminating in an outlet pipe $a^8$, a valve disk and stem for operating said valve disk, a receiving chamber at the bottom of said main casing, having a nozzle or outlet, a liquid spreader pivotally arranged in said chamber, provided with a spreading portion $e^3$ having a hole therein, normally directly beneath the opening in said outlet pipe $a^8$, and means connecting said spreader with said valve disk, for tilting said spreader and moving the hole therein away from the opening in said pipe $a^8$, substantially as and for the purposes set forth.

3. In a valve, the main casing provided with a valve seat and liquid conveying ducts terminating in an outlet pipe $a^8$, a valve disk and stem for operating said valve disk, a receiving chamber at the bottom of said main casing, having a nozzle or outlet, a liquid spreader pivotally arranged in said chamber, provided with a spreading portion $e^3$ having a hole therein, and means connecting said spreader with said valve disk, for tilting said spreader and moving the hole therein away from the opening in said pipe $a^8$, said means consisting essentially, of a stem movably arranged in said valve casing, operatively connected with the valve disk therein, and also with said spreader, for tilting the same and moving the hole therein away from the opening in said pipe $a^8$, substantially as and for the purposes set forth.

4. In a valve, the main casing, comprising therein, a body portion $a$ provided with a valve seat and liquid conveying ducts, a valve disk and stem for operating said valve disk, a receiving chamber at the bottom of said body portion $a$, having a nozzle or outlet, an outlet pipe $a^8$ in said body portion $a$ terminating in said receiving chamber, a longitudinal opening $a^9$ in said body portion $a$, a liquid spreader pivotally arranged in said receiving chamber, provided with a spreading portion $e^3$ having a hole therein, normally directly beneath the opening in said outlet pipe $a^8$, a rod or bar in said opening $a^9$ and operatively connected with said valve disk and also with said spreader, for tilting the same and moving the hole therein away from the opening in said pipe $a^8$, substantially as and for the purposes set forth.

5. In a valve, the main casing, comprising therein, a body portion $a$ provided with a valve seat and liquid conveying ducts, a valve disk and stem for operating said valve disk, a receiving chamber at the bottom of said body-portion $a$, having a nozzle or outlet, an outlet pipe $a^8$ in said body portion $a$ terminating in said receiving chamber, a longitudinal opening $a^9$ in said body portion $a$, and an extension $a^{10}$, a liquid spreader $e$ having a pair of arms $e^2$ embracing said extension and pivotally connected therewith, a solid portion $e^3$ having a hole therein, normally directly beneath said opening in said outlet pipe $a^8$, a connecting piece $e^5$ between said arms $e^2$, a rod or bar in said opening $a^9$ and operatively connected with said valve disk and with said connecting piece $e^5$, for operating said spreader and moving the hole therein away from the opening in said pipe $a^8$, substantially as and for the purposes set forth.

6. In a valve, the main casing comprising therein, a body portion $a$ provided with a valve seat and liquid conveying ducts, a valve stem $c$ and valve disk, a disk $c^5$ rotatively arranged on said stem having a recess $c^6$ therein, a receiving chamber at the bottom of the said body-portion $a$, having a nozzle or outlet, an outlet pipe $a^8$ in said body portion $a$, terminating in said receiving chamber, a longitudinal opening $a^9$ in said body portion $a$, a liquid spreader $e$ pivotally arranged in said receiving chamber, provided with a spreading-portion $e^3$ having a hole therein, normally directly beneath the opening in said outlet pipe $a^8$, a rod or bar $f$ in said opening $a^9$, having its upper end recessed and extending into said recess $c^6$ in said disk $c^5$, and wings $f^3$ thereon in holding engagement with said disk, and the lower end on said rod $f$ extending down into said receiving chamber and operatively connected with said spreader, for tilting the same and moving the hole therein away from the opening in said pipe $a^8$, substantially as and for the purposes set forth.

7. In a valve, the main casing comprising therein, a body portion $a$ provided with a valve seat and liquid conveying ducts, a valve stem $c$ and valve disk, a disk $c^5$ rotatively arranged on said stem, having a recess $c^6$ therein, a receiving chamber at the bottom of said body portion $a$, having a nozzle or outlet, an outlet pipe $a^8$ in said body portion $a$, terminating in said receiving chamber, a longitudinal opening $a^9$ in said body portion $a$ and an extension $a^{10}$, a liquid spreader $e$ having a pair of arms $e^2$ embracing said extension and pivotally connected therewith, a solid portion $e^3$ having a hole therein, normally directly beneath the opening in said outlet pipe $a^8$, a connecting piece $e^5$ between said arms $e^2$, a rod or bar $f$ in said opening $a^9$, having its upper end recessed and extending into said recess $c^6$ in said disk $c^5$ and wings $f^3$ thereon in holding engagement with said disk, and the lower end of said rod $f$ extending down into said receiving chamber and having its recessed portion $f^4$ operatively connected with said connecting piece $e^5$, for operating said spreader and moving the hole therein away from the opening in said pipe, $a^8$, substantially as and for the purposes set forth.

In testimony that I claim the invention set forth above I have hereunto set my hand this 5th day of July, 1895.

ANDREW SCHWIND.

Witnesses:
FREDK. C. FRAENTZEL,
WM. H. CAMFIELD, Jr.